Feb. 12, 1957 T. B. DARLINGTON 2,780,905
PICKER FOR BERRIES AND THE LIKE
Filed May 25, 1953 3 Sheets-Sheet 1
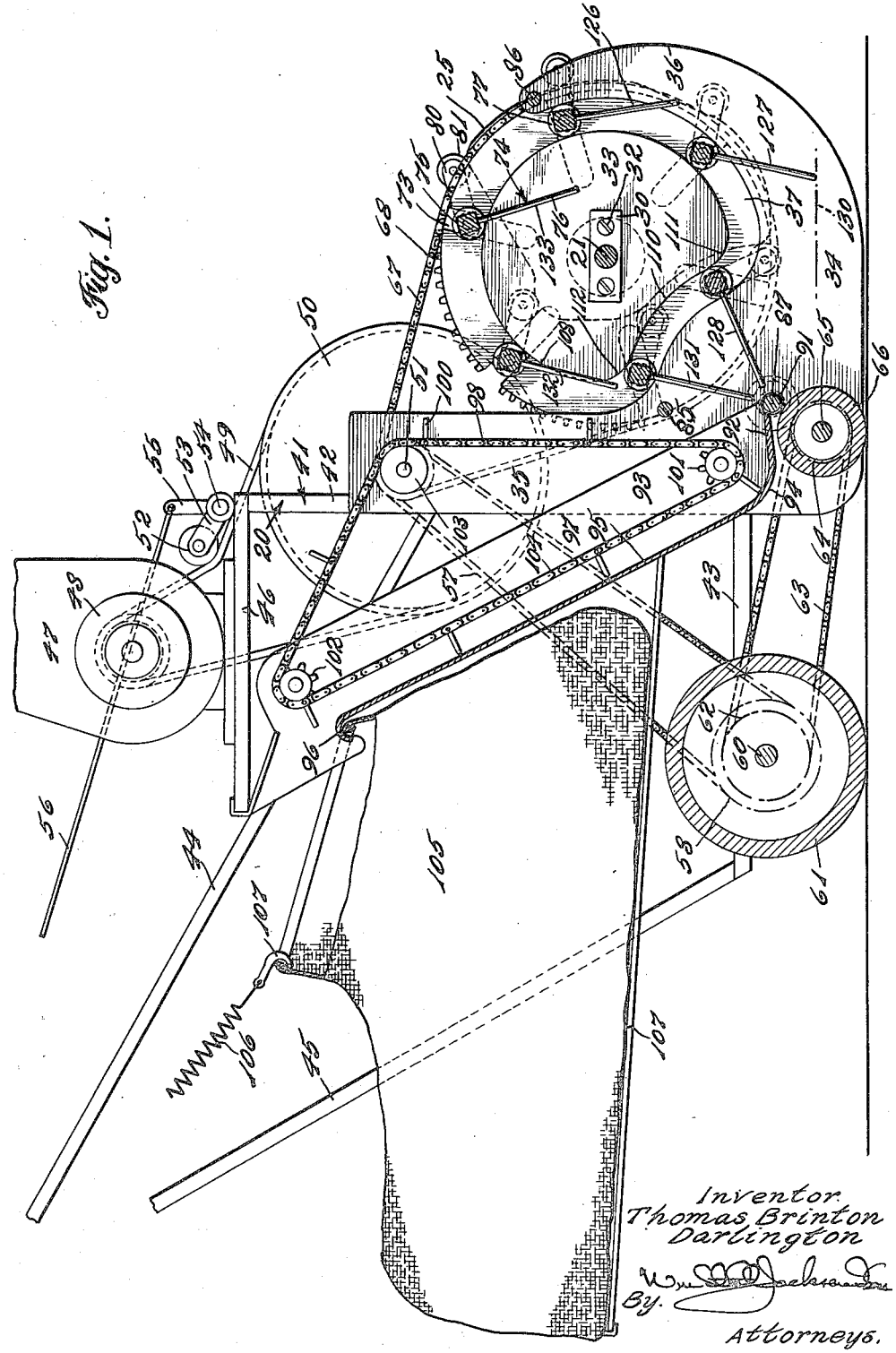
Inventor.
Thomas Brinton
Darlington
By
Attorneys.

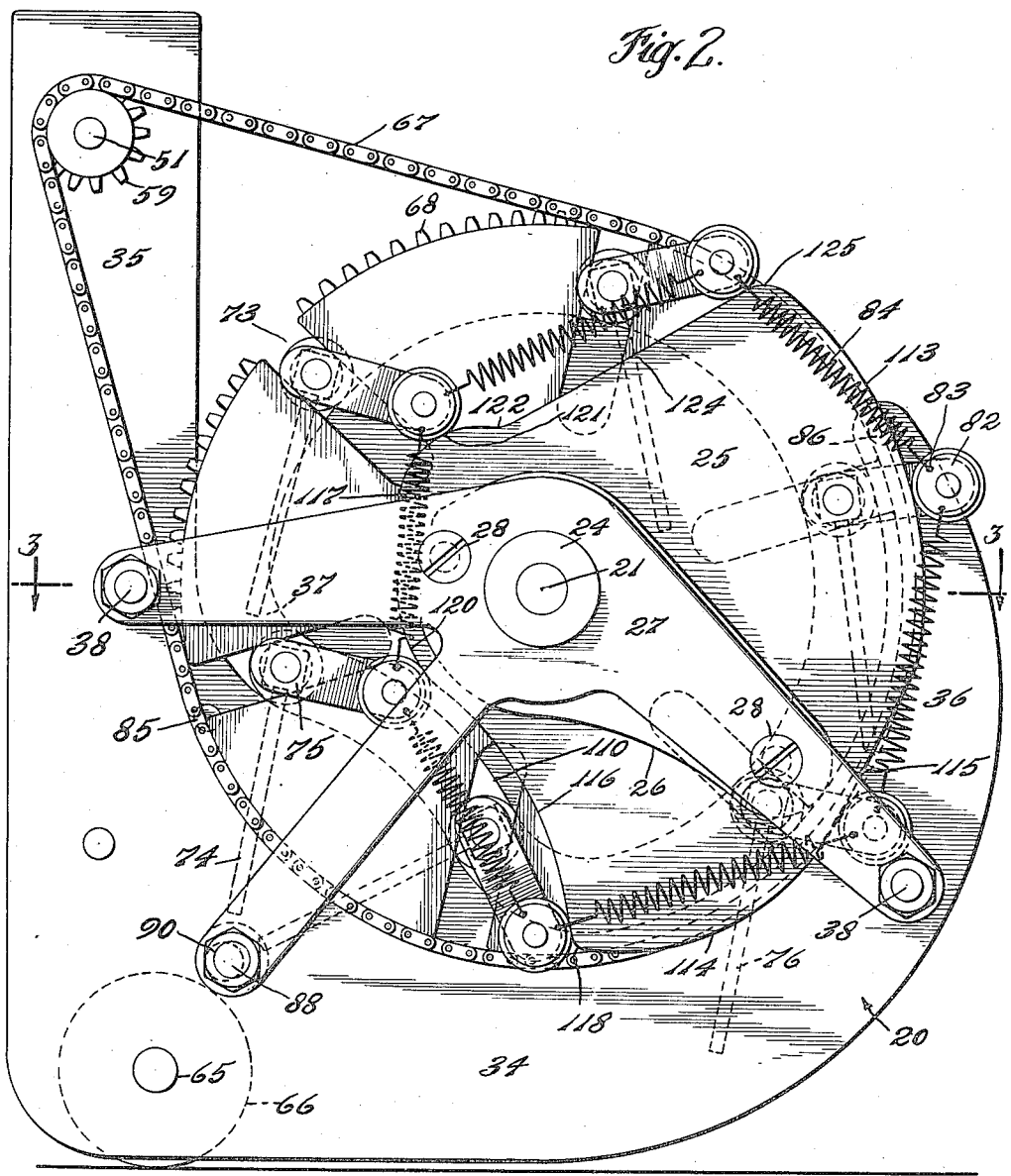

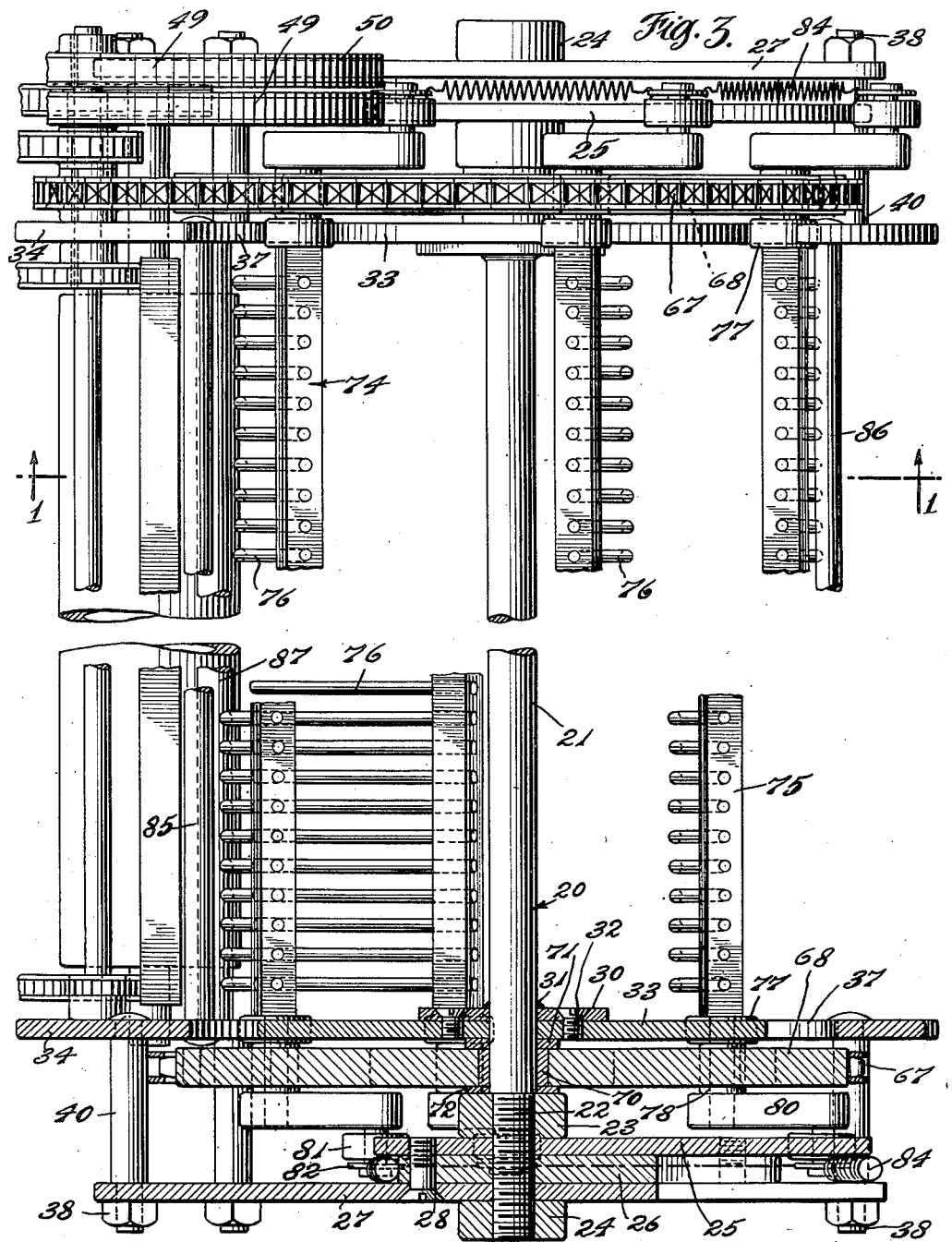

United States Patent Office 2,780,905
Patented Feb. 12, 1957

2,780,905

PICKER FOR BERRIES AND THE LIKE

Thomas Brinton Darlington, Whitesbog, N. J.

Application May 25, 1953, Serial No. 357,153

7 Claims. (Cl. 56—330)

The present invention relates to pickers of the character which are suitable for cranberries, and also for other berries growing on low bushes or vines A purpose of the invention is to reduce the damage to vines or bushes during picking of berries.

A further purpose is to permit the picker to move through denser growths of vines and bushes.

A further purpose is to reduce or avoid bruising or other damage to the berries.

A further purpose is to obtain a higher recovery of berries in picking, and particularly to avoid leaving portions of the vines untouched.

A further purpose is to use picking combs having teeth and to bring the picking combs into the vines with the teeth downwardly directed and then move the picking combs rearwardly through the vines with the outer ends of the picking combs at a constant distance above the ground.

A further purpose is to move the picking combs downwardly with the teeth downwardly directed into the vines, and then to move the picking combs rearwardly while at the same time swinging them rearwardly and maintaining the outer ends of the picking combs at a constant distance above the ground and then to bring the outer ends of the picking combs into less-than-berry-diameter spacing with respect to a stationary picking bar extending across the machine rearwardly of the combs.

A further purpose is to move the support of the picking combs upwardly and rearwardly while retaining the outer ends of the picking combs in less-than-berry-diameter spacing with respect to the picking bar, thus holding the berries which have just been picked or are still on the vines by a subsequent comb before a previous comb is withdrawn upwardly from the vines.

A further purpose is to hold the vines against the ground by a picking roller located rearwardly of the picking combs during the picking operation.

A further purpose is to determine the position of the picking combs in space by a picking comb position cam and to determine the angular or swinging position of the picking combs by a picking comb feathering cam, desirably advancing the picking combs in slots of sprockets.

A further purpose is to reduce the number of vines that are included with the picked berries.

A further purpose is to make the picking combs self-cleaning and to avoid the necessity of shutting down the machine to clean the picking combs.

A further purpose is to avoid raising the vines far above the ground in picking.

A further purpose is to provide dead center bars which will retain the picking combs within the desired path if the springs are slow in acting.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is an elevational view of the device, with parts broken away and shown in section along line 1—1 of Figure 3.

Figure 2 is a fragmentary enlarged end elevation of the device of the invention, omitting the hopper and conveyor.

Figure 3 is an enlarged plan section on the line 3—3 of Figure 2.

Describing in illustration but not in limitation and referring to the drawings:

Prior art picking machines developed for picking cranberries and other berries growing on low vines or bushes have presented several difficulties, which the present invention is designed to overcome.

The action of the prior art machines has in many cases damaged the vines or bushes so seriously that the loss from this damage has interfered with use of the machines.

Furthermore in many of the prior art machines it has been difficult or impossible to go through heavy vine formations, and where the machines have picked heavy vine formations the damage has been so great that hand picking has subsequently been used. Thus even where prior art machines were used, they picked only a part of a cranberry bog in many instances, and other parts required hand picking or were not picked.

The tearing of vines by the prior art machines was not only a serious difficulty from the standpoint of loss of vines, but it resulted in mixing broken fragments of vines with the picked berries and it was necessary to separate this extraneous material. Furthermore the broken fragments of vines were likely to clog the machines, and frequent shut-downs to clean out vines have been necessary.

Difficulty has also been encountered in the prior art due to the tendency of the machines to knock off berries and thus fail to recover them.

A further difficulty has been caused by the tendency of the machines of the prior art to crush or bruise berries, thus making it necessary to sort berries to remove those that are damaged, and furthermore representing a loss from the damaged berries.

In accordance with the present invention, there is very little vine damage, and consequently bog owners can use the machine with confidence and not expect to reduce future yields due to the injury caused to the vines.

Furthermore there is little or no tendency to deposit broken fragments of vines in with the berries, and the hand removal of such vines from the berries is rendered unnecessary. Furthermore the machine is self-cleaning and there is not any need to shut down frequently to clean vines out from the picking combs. Very heavy vine formations can be picked, and the bog owner does not need to supplement the picking by the machine with hand picking and does not leave isolated areas of heavy vine formation unpicked.

Furthermore in accordance with the invention the combs enter the vines at a more favorable entry angle and thus the tendency to knock off berries is reduced.

During the picking action the outer ends or bottoms of the teeth of the picking combs remain at a constant height above the ground, instead of transcribing an arc, and thus fewer berries are missed.

For several reasons the device of the invention avoids bruising or crushing berries. The picking combs move at a uniform slow speed and do not have any rapid whipping action which has heretofore been employed, and is believed to have caused much damage to berries. Furthermore there is no flipping action employed to remove berries from the combs, and thus damage from this cause is avoided.

Considering now the drawings in detail, the machine comprises a frame 20 consisting of a rigid stationary cross shaft 21 threaded at the outer ends at 22 carrying an inner nut 23 and an outer nut 24 between which are clamped a picking comb feathering cam 25, a spacer 26 and a three-armed bracket 27. Two screws 28 hold the bracket, spacer and cam in constant angular relationship.

The shaft 21 at each end inside the feathering cam 25 has flanges 30 secured thereon as by welding at 31 and each flange mounts as by screws 32 a picker comb position cam 33 which extends out around the shaft and parallel to the picker comb feathering cam 25.

Generally in line with the picker comb position cam 33 is placed at each side a forwardly directed side guard 34 which is best seen in Figures 1 and 2 has an upper extension behind the cam at 35, and a forward hook-like upwardly extending end 36 which is in front of the cam 33. The inner edge of the guard 34 at each side, on the rear, bottom and front, forms an opposing cam surface which cooperates with the picker comb position cam to form a cam track 37 which is open at the top.

A picker frame 41 supports guards 34 which in turn support brackets 27 by bolts 38 in the outer ends of the arms of the brackets, there being spacers 40 between each guard and the bracket to hold the guard in the proper position. The picker frame has an upwardly directed supporting element 42 at each end, and diagonally upwardly and rearwardly extending frame elements 44 and 45 which join at the rear to support a guiding handle (not shown) which is held by the operator in walking behind the picker. The frame elements 42 and 44 at the top support a platform 46 extending across from side to side of the machine. The platform carries a driving motor 47, suitably an internal combustion engine, which has double driving pulleys 48 on one end of its shaft at the left side of the machine.

Each pulley 48 operates a belt 49 extending to a speed reduction pulley 50. One speed reduction pulley 50 is keyed on shaft 51 which is journaled in the upper portions 35 of the side guards 34. Each belt 49 is engaged at the outside by a belt tensioning pulley 52 pivoted on a lever arm 53. One lever arm 53 is mounted on a shaft 54 extending across the machine, and a lever 55 is also mounted on the shaft and connected to a rod 56 under the control of the operator to tension or release the belt. The other lever 53 with another lever 55 connected thereto is journaled on the shaft 54. This other lever 55 is operated by another pull rod, which is manipulated by a separate lever 55 and rod 56 to tension the belt or release the tension under the control of the operator. The other pulley 50 journals on the shaft and carries co-journalling on the shaft a sprocket which cooperates with chain 57 to drive sprocket 58 on shaft 60 journalled at the bottom of the frame. Shaft 60 carries rear roller 61 which extends transversely, substantially the full width of the machine, bearing the major weight and moving the machine forward.

It will thus be evident that one of the belt tensioning devices acts to control forward movement of the machine and the other belt tensioning device operates to control advance of the picking combs, and the operator has separate control by operating the different belt tensioning devices.

Shaft 60 also carries at one end a sprocket 62 which drives chain 63 driving sprocket 64 which is mounted at one end on shaft 65, journalled in the guards 34 at the two sides and carrying vine gripping roller 66 which extends desirably the full width of the machine and is preferably smaller than roller 61.

At both ends of shaft 51 are mounted sprockets 59 which drive chains 67 which intermesh with relatively large picking comb manipulating sprockets 68 one at each side of the machine. The sprockets 68 act in the space between cams 33 and 25 and are journalled on the stationary shaft 21 by bushings 70 and spacer washers 71 and 72 on either side.

Besides their sprocket teeth, the sprockets 68 have at preferably equally circumferentially displaced radial positions radial slots 73 which retain and advance picking combs 74.

The picking combs comprise picking comb support bars 75 which extend across the machine between the sprocket slots and rest in the sprocket slots with freedom to turn, and downwardly directed spring picking teeth or fingers 76 which are very similar to teeth on a comb or rake. The teeth are desirably straight as shown.

At the ends where the picking comb support bars pass through the cam slot 37 they journal (on circular portions) follower rollers 77 which ride the outside cam surface on cam 33 and for part of the circumference ride the inside cam surface on the guard 34. Beyond the follower 77 the picker cam support bars journal (on circular portions) rollers 78 which fit in the slots of the sprockets 68. At the outer ends the picker comb support bars rigidly mount feathering levers 80 which desirably extend transversely to the picker comb teeth as shown. At the outer ends the picker comb feathering levers 80 journal follower rollers 81 which ride the outsides of the picker comb feathering cams 25.

At the extreme outer ends beyond the rollers the levers 80 carry washers 82 rotatable with respect to the arms 80 which have openings 83 in which are engaged the hook ends of spiral tension springs 84 which interconnect from the position of one follower roller 81 to the next and tend to hold the follower rollers against the outside of the picker comb feathering cam 25. The springs act in the space around spacer 26.

At positions which would engage the picker comb teeth adjoining dead center if the springs do not act promptly, picker comb restoring bars 85 and 86 extend across the machine anchored at the ends in the side guards. It will be evident that they are slightly outside the line of normal movement of the teeth of the combs, but if the teeth of the combs swing out too far the bars tend to bring them into proper position.

Immediately above and slightly forward of the axis of vine gripping roller 66 a normally stationary picking bar 87 extends across the machine. For the purpose of adjustment, the picking bar is mounted eccentrically on threaded shanks 88 at the ends which are held by nuts 90 in the middle arm of bracket 27. There is sufficient freedom in the opening 91 at which the picking bar passes through the side guards to permit adjustment by the eccentric position.

Immediately to the rear of the picking bar is located a forwardly extending bottom portion 92 of a conveyor apron 93 having a lower rear curved portion 94, and diagonally upwardly inclined rearward portion 95 terminating in a reverse bend lip 96 and having side portions 97. A chain conveyor 98 having flights 100 is mounted on sprockets 101, 102 and 103, the sprockets 101 and 102 being positioned so that the operative stretch 104 carries the flights in less-than-berry-diameter spacing with respect to the walls 92, 94 and 95 to move the berries upward. As sprocket 103 is mounted on shaft 51 the conveyor is driven from the shaft.

At the upper end of wall 95 a bag or other receptacle 105 is provided, the mouth being held open by tension spring 106 and hook 107 from the frame, the other side of the mouth being anchored under the reverse bend 96. The bottom of the bag rests on a rearwardly extending platform 107 supported in the frame.

It will be evident that any position of each picking comb at a corresponding position in the cycle is determined from the standpoint of position in space by picking comb cam 33, but from the standpoint of angular position or amount of feathering it is determined by the picking comb feathering cam 25 which acts on the follower 81 which acts on the end of the picking comb and its follower lever.

Picking comb position cam 33 has a generally convex circular portion 108 extending across the upper rear, the top, the front, and the lower front as viewed in Figure 1, but has disposed toward the lower rear a concave portion 110 symmetrically placed with respect to the picking bar 87 and joined to the convex portion by zones of inflection 111 and 112 respectively at the two ends.

Correspondingly as viewed in Figure 2, the picking comb feathering cam 25 has a convex circular portion 113 at the front and extending to the lower front at 114 interrupted by a chord portion or flat at 115 near the lower front where the combs enter the vines. At the lower rear there is a concave portion 116 symmetrical with the concave portion 110 of the picking comb position cam at this point but on a slightly larger radius with the picking bar center as the center. The concave portion merges with a straight portion 117 at the back, there being a zone of inflection at 118 between the concave portion and the convex portion, and a zone of inflection 120 between the concave portion and the flat portion at the back.

At the upper rear there is a convex or bulbous lobe 121 on the cam 25 which merges with a concave portion beyond at 122, followed by a diagonally upwardly extending portion 124 at the top which merges in a fillet 125 to the convex portion 113.

The positions assumed by the picking combs are well shown in Figure 1. Position 126 illustrates the picking comb moving downwardly, and generally downwardly directed just before it enters the vines. Between position 126 and the next position 127, the picking comb moves straight down into the vines, being substantially vertical at the time it enters the vines. Between position 127 which begins a substantial backward sweep and position 128 at the time the picking comb outer ends reach a position of less-than-berry-diameter distance from the picking bar, there are two composite motions which cause the picking comb to move rearwardly in a position in which the lower downwardly directed ends are at a constant level 130 with respect to the ground:

1. Due to the downward curve of the position cam before the concave portion 110 is encountered, the supporting bars of the picking combs move downward.

2. Due to the action of the convex portion 114 of the feathering cam which engages the follower rollers 80 at the same time, the outer ends of the picking combs swing rearwardly to position 128.

The effect is to keep the lower ends at the constant level 130 as they move rearward, before they swing rearwardly.

From position 128 to position 131 which comes next, the outer ends of the picking combs remain at a constant less-than-berry-diameter distance with respect to the picking bar so that any berry held either loosely or on the vine above the comb at position 128 cannot drop off between position 128 and position 131. This relative forward swinging of the outer ends of the picking combs is caused by the concave portion 116 of the feathering cam.

Between position 131 and position 132, the picking comb moves substantially vertically and withdraws from the vines, any berries being held by the succeeding picking comb. All the time the machine is advancing and the slack is taken out of the vines until tension is applied on the berry by one of the picking combs against the vine clamped by the roller 66 and the berry is detached from the vine. The next time the picking comb advances from position 128 to position 131, the berry is thrown rearwardly into the hollow of apron wall 92 and is carried upwardly along apron walls 94 and 95 by the conveyor to deposit it in the bag 105.

Experiments indicate that it is best to place the picking bar at about three inches above the ground in picking New Jersey cranberries and it is best to have a space of about one-eighth inch between the outer ends of the picking comb and the picking bar in positions 128 and 131 and in intermediate positions. Thus no vine is raised more than three inches from the ground and all vines, free or tangled, long or short, are pinned down by the vine clamping roller 66 and held by a succession of combs between positions 128 and 131 until the roller, by virtue of the forward motion of the machine, pulls the vine straight through the teeth of the picking combs and through the space between the outer ends of the picking comb teeth and the picking bar.

It will be understood, of course, that actual picking in many cases will not occur until several combs have encountered the berry after the one which originally picked up the berry.

After position 132 the picking comb is advanced upwardly and forwardly and swung forwardly to position 133.

While six combs have been used in the form illustrated, it will be evident that any suitable number of combs may be employed.

It will be evident that the force of gravity and the picking forces tend to hold the feathering followers to the feather cams, while the feathering springs 84 control vibrational forces and are effective at the two dead centers, supplemented by the action of the dead center bars 85 and 86 if the spring pull is not sufficient.

Thus it will be evident that the teeth from each comb enter the vines vertically downwardly, then move backward with the tops at a constant height above the ground, thus raking through the vines under the berries. Toward the rear of this pick-up backsweep the tips of the teeth rise until they approach the picking bar. The space between the tips of the teeth and the picking bar is small enough so that no berry can fall through and is adjustable for berry size by eccentric adjustment at 88. This spacing is maintained as the combs swing rearwardly still radially to the picking bar until they approach a vertical position again.

Just after the next comb attains the spacing at the ends of its picking backsweep the previous comb rises vertically from the picking bar, releasing the vines and berries which are then held by the next comb. No vine is raised higher than the picking bar by virtue of the machine operation. When the vines are pulled taut and the berries are at the tips of the picking bar teeth, the berries are picked if they have not previously been detached.

While the device of the invention is believed to have its best application to the picking of cranberries, it will be evident that it is also suitable for picking other low growing berries.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In a picker for berries and the like, a picker frame, a picking bar running across the front of the frame parallel to the ground, a set of picking combs extending across the picker frame generally in front of and above the picking bar, a picking comb position cam on the frame at one end of the picking combs, followers on the picking combs engaging the picking comb position cam, levers on one end of the picking combs, a picking comb feathering cam on the frame at the end of the picking combs having the levers, followers on the levers engaging the picking comb feathering cam, and means operatively associated with the frame for driving the picking combs in sequence along the cams to progress the picking combs forward at the top, down the front, rearward at the bottom and upward at the rear, the radial outer ends of the picking combs passing within less-than-berry-diameter relation to the picking bar.

2. In a picker for berries and the like, a picker frame, a picking bar running across the front of the frame parallel to the ground, a set of picking combs extending across the picker frame generally in front of and above the picking bar, a picking comb position cam on the frame at one end of the picking combs, followers on the picking combs engaging the picking comb position cam, levers on one end of the picking combs, a picking comb feathering cam on the frame at the end of the picking combs having the levers, followers on the levers engaging the picking comb feathering cam, means operatively associated with the frame for driving the picking combs in sequence along the cams to progress the picking combs forward at the top, down the front, rearward at the bottom and upward at the rear, the picking comb position cam and the picking comb feathering cam having curved surfaces which bring the radial outer end of the picking comb into less-than-berry-diameter relation to the picking bar when the picking comb is forward of the picking bar and hold the radial outer end of the picking comb in less-than-berry-diameter relation with the picking bar while the picking comb moves rearward, preparatory to withdrawing upwardly.

3. A picker of claim 2, in which the picking comb position cam and the picking comb feathering cam have portions which swing the radial outer end of the picking comb rearwardly as the picking comb moves rearwardly, the radial outer end of the picking comb remaining the same distance above the ground as it moves rearwardly.

4. A picker of claim 2, in which a plurality of picking combs are positioned at the same time with the radial outer ends in less-than-berry-diameter relation to the picking bar.

5. A picker of claim 4, in which one of said picking combs is above the picking bar in position to move up and the other picking comb is in front of the picking bar in position to move to the rear and upwardly.

6. A picker of claim 2, in combination with tension springs interconnecting the levers at the ends remote from the picking combs.

7. A picker of claim 2, in which the means for driving the picking combs includes sprockets rotatably mounted on the frame at the ends of the picking combs having radially outwardly extending slots which receive the picking combs.

References Cited in the file of this patent

UNITED STATES PATENTS

| | | |
|---|---|---|
| 546,777 | Hasey | Sept. 24, 1895 |
| 889,968 | Rickey | June 9, 1908 |
| 1,035,485 | Sletto | Aug. 13, 1912 |
| 1,047,327 | Stewart | Dec. 17, 1912 |
| 1,114,416 | Tingsley et al. | Oct. 20, 1914 |
| 1,707,878 | Roosa | Apr. 2, 1929 |
| 1,908,082 | Tinsley | May 9, 1933 |
| 2,230,523 | Byhre | Feb. 4, 1941 |
| 2,504,459 | Schneider et al. | Apr. 18, 1950 |
| 2,643,754 | Doak | June 30, 1953 |
| 2,664,692 | Darlington | Jan. 5, 1954 |
| 2,679,133 | Soderholm | May 25, 1954 |
| 2,696,706 | Getsinger | Dec. 14, 1954 |